United States Patent

Broder et al.

Patent Number: 5,909,677
Date of Patent: Jun. 1, 1999

[54] METHOD FOR DETERMINING THE RESEMBLANCE OF DOCUMENTS

[75] Inventors: Andrei Zary Broder, Menlo Park; Charles Gregory Nelson, Palo Alto, both of Calif.

[73] Assignee: Digital Equipment Corporation, Maynard, Mass.

[21] Appl. No.: 08/665,709

[22] Filed: Jun. 18, 1996

[51] Int. Cl.$^6$ .................................................. G06F 17/30

[52] U.S. Cl. ............................ 707/3; 707/203; 707/201; 707/1

[58] Field of Search .............................. 707/3, 6, 1, 203, 707/201

[56] References Cited

U.S. PATENT DOCUMENTS

| | | | |
|---|---|---|---|
| 5,442,780 | 8/1995 | Takanashi et al. | 707/1 |
| 5,544,049 | 8/1996 | Henderson et al. | 704/7 |
| 5,557,249 | 9/1996 | Califano | 707/100 |
| 5,778,363 | 7/1998 | Light | 707/5 |

*Primary Examiner*—Thomas G. Black
*Assistant Examiner*—Greta L. Robinson

[57] ABSTRACT

A method for facilitating the comparison of two computerized documents. The method includes loading a first document into a random access memory (RAM), loading a second document into the RAM, reducing the first document into a first sequence of tokens, reducing the second document into a second sequence of tokens, converting the first set of tokens to a first (multi)set of shingles, converting the second set of tokens to a second (multi)set of shingles, determining a first sketch of the first (multi)set of shingles, determining a second sketch of the second (multi)set of shingles, and comparing the first sketch and the second sketch. The sketches have a fixed size, independent of the size of the documents. The resemblance of two documents is provided using a sketch of each document. The sketches may be computed fairly fast and given two sketches the resemblance of the corresponding documents can be computed in linear time in the size of the sketches.

30 Claims, 2 Drawing Sheets

METHOD FOR DETERMINING THE RESEMBLANCE OF DOCUMENTS

FIELD OF THE INVENTION

The present invention relates to the field of comparing data files residing on one or more computer systems, and more particularly to the field of determining the resemblance of documents.

BACKGROUND OF THE INVENTION

As is known in the art, computer users create and store data files as documents in computer systems. As is also known, these same computer users, for a variety of reasons, are often interested in determining the similarity of two documents.

One approach, for example, is to record samples of each document, and to declare documents to be similar if they have many samples in common. The samples could be sequences of fixed numbers of any convenient units, such as English words. Such a method requires samples proportional in size with the length of the documents.

Another approach to this problem is based on single word "chunks." Such a method employs a registration server that maintains registered documents against which new documents can be checked for overlap. The method detects copies based on comparing word frequency occurrences of the new document against those of registered documents.

What is needed is a method to determine whether two documents have the same content except for modifications such as formatting, minor corrections, web-master signature, logo, etc., using small sketches of the document, rather than the full text.

SUMMARY OF THE INVENTION

In accordance with the present invention, a method of determining the resemblance of a plurality of documents stored on a computer network including loading a first document into a random access memory (RAM), loading a second document into the RAM, reducing the first document into a first set of tokens, reducing the second document into a second set of tokens, converting the first sequence of tokens to a first (multi)set of shingles, converting the second sequence of tokens to a second (multi)set of shingles, determining a first fixed size sketch of the first (multi)set of shingles, determining a second fixed size sketch of the second (multi)set of shingle, and comparing the first sketch and the second sketch. With such a method, computation of the resemblance of two documents is provided using a sketch of each document. The sketches may be computed fairly fast and given two sketches the resemblance of the corresponding documents can be computed in linear time in the size of the sketches.

DESCRIPTION OF THE PREFERRED EMBODIMENTS(S)

Figure 1:
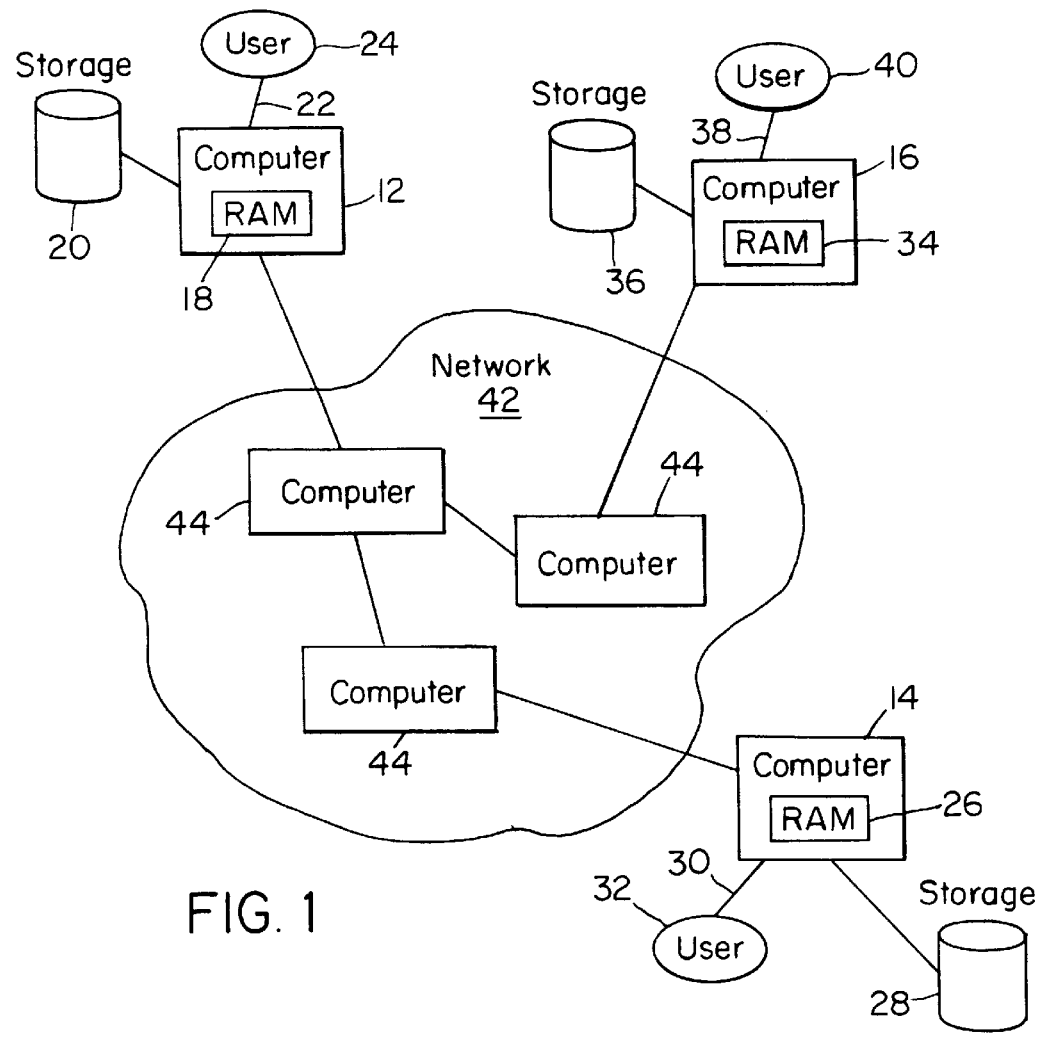
FIG. 1 is a block diagram of an exemplary computer network that may employ the present invention.

Referring to FIG. 1, an exemplary computer network is shown to include three end systems 12, 14, and 16. Each of the end systems is shown as having a random access memory (RAM), a storage unit, and a user interface to a user. Specifically, end system 12 contains a RAM 18, a storage unit 20, a user interface 22, and a user 24; end system 14 contains a RAM 26, a storage unit 28, a user interface 30, and a user 32; end system 16 contains a RAM 34, a storage unit 36, a user interface 38, and a user 40. The end systems 12, 14, and 16 are further shown connected to a network 42. The network 42 is further shown to include several network systems 44. The network systems 44 provide a means for the end systems 12, 14, and 16 to transfer all types of information. One type of information residing in each of the end systems may be data files generally referred to as documents. These documents may reside, for example, in the RAM and/or storage unit of any of the end systems.

Figure 2:
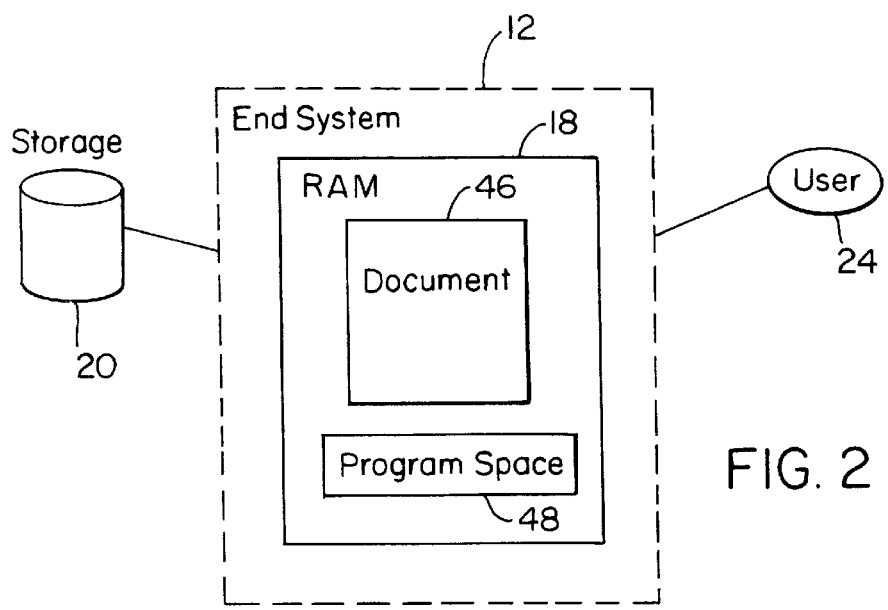
FIG. 2 is a block diagram of the random access memory (RAM) of FIG. 1.

Referring to FIG. 2, the end system 12 of FIG. 1 is shown in greater detail. An exemplary document 46 is shown to reside in the RAM 18. The exemplary document 46 may, for example, have resided on the storage unit 20, and been loaded into the RAM 18 by the end system 12. The RAM 18 is further shown to include a program space 48 wherein the present invention may, for example, reside. As will be described in detail below, a user 24 may want to compare the document 46 with some other document within the RAM 18, or some other document residing in a RAM and/or storage unit of some other end system accessible through the network 42 of FIG. 1.

In general, each document, 46 for example, may be viewed as a sequence of tokens. Tokens may be characters, words, or lines. The present invention assumes that one of several parser programs that are known in this art is available to take an arbitrary document and reduce it to a canonical sequence of tokens. In the present invention, canonical means that any two documents that differ only in formatting or other information that is chosen to be ignored, e.g. punctuation, html commands, capitalization, will be reduced to the same sequence. Thus, the present invention will refer to any document as a canonical sequence of tokens.

The first need is to associate to every document D a set of subsequences of tokens $S(D,\omega)$ where $\omega$ is a parameter defined below.

A contiguous subsequence contained in D is referred to as a shingle. Given a document D one can associate to it its $\omega$-shingling defined as a multiset (as referred to as a bag) of all shingles of size $\omega$ contained in D. For example, a 4-shingling of (a, rose, is, a, rose, is, a, rose)

is the bag

{(a, rose, is, a), (rose, is, a, rose), (is, a, rose, is), (a, rose, is, a), (rose, is, a, rose)}.

At this point there are at least two ways to proceed. A first option keeps more information about the document. A second option is more efficient.

In the first option, by labeling each element of a $\omega$-shingling with its occurrence number its labeled $\omega$-shingling is obtained, referred to as set $S(D, \omega)$. Using document D as an example, the set $S(D, \omega)$ would be {(a, rose, is, a, 1), (rose, is, a, rose, 1), (is, a, rose, is, 1), (a, rose, is, a, 2), (rose, is, a, rose, 2)}.

Using the second option, the set $S(D, \omega)$ is taken to be the set of shingles in D. Thus, staying with document D as an example, the set $S(D, \omega)$ would be {(a, rose, is, a), (rose, is, a, rose), (is, a, rose, is)}.

The present invention describes a use of resemblance for determining whether two documents are roughly the same. Resemblance is a number between 0 and 1, defined precisely below, such that when the resemblance is close to 1 it is likely that the two documents are roughly the same. As will be fully described below, to estimate the resemblance of two documents it suffices to keep for each document a sketch of a few hundred bytes. In a preferred embodiment three to eight hundred bytes suffices. The sketches can be computed fairly fast (linear in the size of the documents) and given two sketches the resemblance of the corresponding documents can be computed in linear time in the size of the sketches.

The resemblance r for a shingle size $\omega$ of two documents A and B is defined as $$r_\omega(A, B) = \frac{|S(A, \omega) \cap S(B, \omega)|}{|S(A, \omega) \cup S(B, \omega)|}$$

Hence, the resemblance is some number between 0 and 1, and for any shingle size $r\omega(A,A)=1$, i.e., A resembles itself 100% for any size.

By way of another example, if

A=(a, rose, is, a, rose, is, a, rose)

and

B=(a, rose, is, a, rose, is, a, flower, which, is, a, rose)

then under the first option above, A resembles B 70% for shingle size 1, 50% for size 2, 30% for size 3, etc. Under the second option above, A resembles B 60% for size 1, 50% for size 2, 42.85% for size 3, etc.

It should be pointed out that even under the first option above, if A resembles B 100% for shingle size 1, it only means that B is an arbitrary permutation of A; for larger sizes if A resembles B 100% it is still the case that B is a permutation of A but only certain permutations are possible, e.g., (a, c, a, b, a) resembles (a, b, a, c, a) 100% for size 2. To make resemblance more sensitive to permutation changes a larger size must be taken; on the other hand a large size is possibly over sensitive to small alterations since the change in one token affects $\omega$ tokens.

It should also be noted that resemblance is not transitive, but neither is the idea of "roughly the same;" for example, consecutive versions of a paper might well be "roughly the same," but version 100 is probably quite far from version 1.

In order to estimate the resemblance, one fixes a shingle size $\omega$, and lets $\Omega$ be the set of all labeled (for the first option above) or unlabelled (for the second option above) shingles of size $\omega$. Without loss of generality one can assume the $\Omega$ is totally ordered. Therefore, fix a parameter s. For each set $W \subseteq \Omega$ define $MIN_s(W)$ as $$Min_s(W) = \begin{cases} \text{the set of the smallest } s \text{ element in } W, \text{ if } |W| \geq s; \\ W, \text{ otherwise} \end{cases}$$

where "smallest" refers to the order defined on $\Omega$.

If $\pi: \Omega \to \Omega$ is a permutation chosen uniformly as random and $M(A)=MIN_s(\pi(S(A, \omega)))$ and $M(B)=MIN_s(\pi(S(B, \omega)))$, the value $$\frac{|MINs(M(A) \cup M(B)) \cap M(A) \cap M(B)|}{|MINs(M(A) \cup M(B))|}$$

is an unbiased estimate of the resemblance of A and B. Proof of this follows:

$$MIN_s(M(A) \cup M(B)) = MIN_s(\pi(S(A, \omega)) \cup (\pi(S(B, \omega)))$$

$$= MIN_s(\pi(S(A, \omega) \cup S(B, \omega)))$$

Let $\alpha$ be the smallest element in $(\pi(S(A,\omega)) S(B,\omega))$. Then $$Pr(\alpha \in M(A) \cap M(B) = Pr(\pi^{-1}(\alpha) \in S(A, \omega) \cap S(B, \omega))$$

$$= \frac{|S(A, \omega) \cap S(B, \omega)|}{|S(A, \omega) \cup S(B, \omega)|} = r_\omega(A, B).$$

Since this can be repeated for every element of $MIN_s(\pi(S(A,\omega)) S(B,\omega)))$ the claim is proved.

Given a document D, the random set $MIN_s(\pi(S(D, \omega)))$ is referred to as the sketch of document D.

To produce a sample a random permutation is needed. The total size of a shingle is relatively large. For example, if shingles are made of seven words each, a shingle will contain about 40–50 bytes on average. Hence, to reduce storage one first associates each shingle a (shorter) id of $l$ bits, and then use a random permutation $\pi$ of the set $\{0, 1, \ldots 2l\}$. This illustrates a trade-off, i.e., if one takes $l$ large then one can ensure that most/all id's will be unique, but one will have to pay a storage penalty. On the other hand, a large number of collisions will degrade the estimate as explained subsequently.

Let $f: \Omega \to \{0, 1, \ldots 2l-1\}$ be the function that produces this id. Once $l$ fixed, what one is estimating is $$r_{\omega,f}(A, B) = \frac{|f(S(A, \omega)) \cap f(S(B, \omega))|}{|f(S(A, \omega)) \cup f(S(B, \omega))|}$$

rather than $$r_\omega(A, B) = \frac{|S(A, \omega) \cap S(B, \omega)|}{|S(A, \omega) \cup S(B, \omega)|}.$$

Fix an arbitrary set $S \subseteq \Omega$ of size n. Then if $f$ is chosen uniformly at random $$E(|f(S)|) = 2^l\left(1 - \left(1 - \frac{1}{2^l}\right)^n\right) = n - \binom{n}{2}\frac{1}{2^l} + \binom{n}{3}\frac{1}{2^{2l}} + \ldots$$

If $l$ substantially larger than log n then $$E(|f(S)|) \approx n - \binom{n}{2}\frac{1}{2^l},$$

in other words, in this case one can ignore the effect of multiple collisions, that is, three or more distinct elements of S having the same image under $f$. Furthermore, it can be argued that the size of $f(S)$ is fairly well concentrated. Specifically, $$Pr(||f(S)| - E(|f(S)|| > \lambda \sqrt{n}) < e^{\frac{-\lambda}{2}}.$$

This leads to the fact that with high probability over choices of $f$ $$|r_{w,f}(A, B) - r_w(A, B)| < \frac{|S(A, w) \cup S(B, w)|}{2^{l-1}}.$$

In the preferred embodiment, $f$ is not totally random, and the probability of collision might be higher. A preferred choice is to take Rabin's fingerprinting function, in which case the probability of collision of two strings $s_1$ and $s_2$ becomes $\max(|s_1|,|s_2|)/2 \ell 1$, where $|s_1|$ is the length of the string $s_1$ in bits.

By way of example, to cluster World Wide Web (WWW) documents, the size of a typical set of shingles is about 500 and the length in bits of a shingle is about 200. Thus, taking $\ell=24$ would lead to a fairly minimal deterioration of the estimate but taking $\ell=16$ is borderline. On the other hand, if one intends to cluster a large set of WWW documents it might be advantageous to take a larger < to avoid spurious collisions.

To produce a sample one needs a random permutation pi: $\{0, 1, \ldots, 2\} \rightarrow \{0, 1, \ldots, 2\}$. In practice one may prefer implementing $X(f(.))$ rather than $f(.)$. One preferred example to do this is to fingerprint each sequence of tokens using a fingerprinting method such as that described by M. O. Rabin in "Fingerprinting by Random Polynomials," Center for Research in computing Technology, Harvard University, Report TR-15-81, 1981. Briefly, fingerprints are short tags for larger objects. Fingerprints have the property that if two fingerprints are different then the corresponding objects are certainly different and there is only a small probability that two different objects have the same fingerprint. When two objects have the same fingerprint it is referred to as a collision.

For the purposes of the present invention rather than fingerprint a string as such, one first extends it with a suitable number of nulls so that fingerprints will appear "more random." For example, without this extension by nulls, two strings that differ only in the last letter will differ only in the last eight bits of their fingerprint.

Since collisions are of little importance in the present invention (they would only lead to overestimates of the resemblance), a preferred embodiment may use 32 bit fingerprints or even 24 bit fingerprints. For efficiency, it is preferred that, rather than keep the set $MIN_s(\pi(S(D, \omega)))$, the $MIN_s$ of the set of fingerprints that are 0 mod M for a chosen M are kept.

In the preferred embodiment, for the first option above, the set $MIN_s$ should be kept in a heap, with the maximum at the root. A heap is an efficient data structure for representing a priority queue, i.e., a data structure for representing a set of prioritized elements, in which it is efficient to insert a new element of the set, and also efficient to select and remove whatever element of the set has the maximum priority. A new fingerprint should replace the current root whenever it is smaller and then one should reheapify. The expected number of times this happens is O(s log(n/M)), where n is the number of tokens in the document and the cost is O(s log s); this is because the probability that the k'th element of a random permutation has to go into the heap is s/k. Thus, the expected total cost for the heap operations is O(s log s log(n/M)).

For the second option described above, a balanced binary search tree is kept. Examples are AVL trees, red-black trees, randomized search trees, and skip lists. The cost is still O(s log s log(n/M)) but the constant factor is probably larger.

The larger the sample, the more accurate the results are likely to be. But larger samples result in larger storage costs. The number of common shingles in the sample has a hypergeometric distribution. Since the size of the sample is usually much smaller than the size of the document, the hypergeometric distribution may be estimated by a binomial distribution. Under this approximation, if r is the resemblance, then the probability that the estimate is with $[r-\epsilon, r+\epsilon]$ is given by $$p(s, r, \varepsilon) = \sum_{s(r-\varepsilon) \leq k \leq s(r-\varepsilon)} \binom{s}{k} r^k (1-r)^{s-k}.$$

Computing the fingerprints is typically fast even if each shingle is done from scratch. The total cost in this case is O(wn) where the O notation hides the width of the token. However, a factor of w may be gained if one takes advantage of the fact that here we are computing the fingerprint of a "sliding window," particularly if the window's width in bytes is fixed or within a narrow range. This is automatic if the tokens have fixed width. Otherwise, tokens may be defined to have a small maximum width and then padded as necessary to get this effect.

For example, one may define a word to have at most 8 bytes. Longer words may be viewed as the concatenation of several words. When fingerprints are computed shorter words may be padded to 8 bytes.

If the multiplicity of shingles is recorded in the sketch, a check must be made for the number of times each shingle was encountered before. This may be done by fingerprinting it and then searching a hash table. Once the proper label is decided, a second fingerprint needs to be computed. Some care is needed to avoid too much dependence among fingerprints of the same shingle with different labels.

If the multiplicity of shingles is ignored in the sketch, the frequency checks are avoided altogether, computations are avoided altogether, but a binary search tree rather than a heap needs to be kept to insure that the same value is not inserted twice.

We now describe how to estimate the resemblance of two documents, given their sketches. It is preferred that the sketch be stored as a list sorted in increasing order. Then all one needs to do is to merge-sort the two sketches removing duplicates, and count how many duplicates were encountered within the first s outputs. This procedure requires O(s) time.

Figure 3:
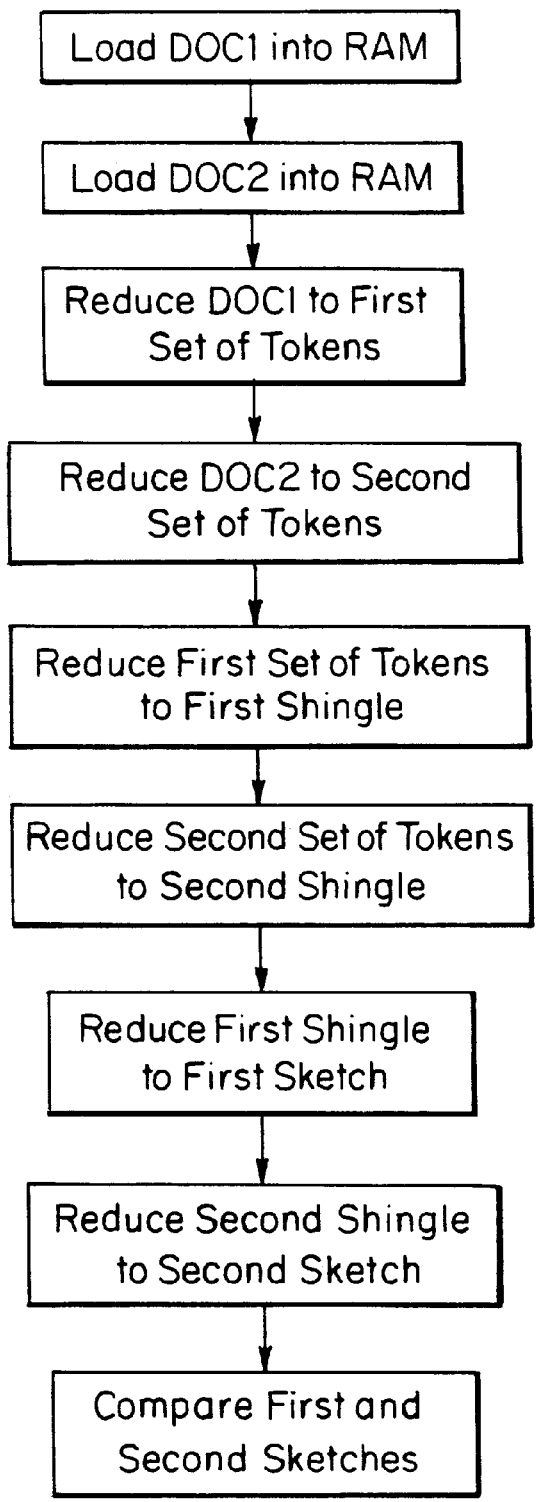
FIG. 3 is a flow chart illustrating the present invention.

Referring now to FIG. 3, a flow diagram of the present invention begins at step 100 wherein an end system loads a first document into its random access memory (RAM). At step 102, the end system loads a second document into its RAM. At step 104, the first document is parsed into a first sequence of tokens. At step 106, the second document is parsed into a second sequence of tokens. Next, at step 108, the first set of tokens is reduced to a first bag of shingles. At step 110, the second set of tokens is reduced to a second bag of shingles. Next, at step 112, the first bag of shingles is reduced to a first fixed-size sketch, and at step 114, the second bag of shingles is reduced to a second fixed-size sketch. At step 116, the resemblance of the first document and the second document are determined by comparing the first sketch and the second sketch.

It should also be noted that the present invention applies also to comparing more than two documents. For m documents, evaluating all resemblances takes O(m²s) time. However, a technique referred to as "greedy clustering" may be used. Specifically, a set of current clusters (initially empty) is kept and processes the sketches in turn. For each cluster a representative sketch is kept. If a new sketch sufficiently resembles a current cluster then the sketch is added to it; otherwise a new cluster is started. In practice every fingerprint, if sufficiently long, probably belongs only to a few clusters. With this assumption, if for each fingerprint encountered it is remembered to which clusters it belongs and the fingerprints are stored in a hash table, the entire procedure may be implemented in O(ms) time. As a representative sketch, the s most popular fingerprints in a cluster may be taken, or just the first member of the cluster.

An alternative clustering method could be to find for each fingerprint all the sketches where it belongs. Then for each two sketches that have a common fingerprint compute the actual resemblance of the corresponding documents. This method may be advantageous when most clusters contain a single document. It is again important that fingerprints be sufficiently long to avoid spurious collisions.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method of determining the resemblance of a plurality of documents comprising the steps of:

reducing a first of the plurality of documents into a first sequence of tokens;

reducing a second of the plurality of documents into a second sequence of tokens;

converting the first sequence of tokens to a first set of shingles;

converting the second sequence of tokens to a second set of shingles;

determining a first sketch of the first document from the first set of shingles;

determining a second sketch of the second document from the second set of shingles; and comparing the first sketch and the second sketch so as to determine the resemblance between the first document and the second document.

2. The method as defined in claim 1, wherein the first sketch includes less than all of the first set of shingles, and the second sketch includes less than all of the second set of shingles.

3. The method as defined in claim 1, wherein the first sketch and the second sketch are fixed in size.

4. The method as defined in claim 3, further comprising the step of:

computing the resemblance between the first document and the second document in linear time corresponding to the fixed size of the first sketch and the second sketch.

5. The method as defined in claim 1, further comprising the steps of:

storing the first document in a first memory prior to reducing the first document into the first sequence of tokens; and storing the second document in a second memory prior to reducing the second document into the second sequence of tokens.

6. The method as defined in claim 5, wherein the first memory and the second memory are the same memory.

7. A method for determining the resemblance of a plurality of documents each including a respective plurality of elements, the method comprising the steps of:

generating a first representation of a first of the plurality of documents, the first representation including at least one proper subset of the elements of the first document;

generating a second representation of a second of the plurality of documents, the second representation including at least one proper subset of the elements of the second document; and comparing the first representation and the second representation so as to determine the resemblance between the first document and the second document.

8. The method as defined in claim 7, wherein the first representation and the second representation are fixed in size.

9. The method as defined in claim 8, further comprising the step of:

computing the resemblance between the first document and the second document in linear time corresponding to the fixed size of the first representation and the second representation.

10. The method as defined in claim 7, wherein the first document has a first size, and wherein the step of generating the first representation includes generating the first representation in linear time corresponding to the first size of the first document.

11. The method as defined in claim 7, wherein the second document has a second size, and wherein the step of generating the second representation includes generating the second representation of the second document in linear time corresponding to the second size of the second document.

12. The method as defined in claim 7, wherein the at least one subset of the elements of the first document is at least one random subset of the elements of the first document.

13. The method as defined in claim 7, wherein the at least one subset of the elements of the second document is at least one random subset of the elements of the second document.

14. The method as defined in claim 7, further comprising the steps of:

storing the first representation as a first ordered list; and storing the second representation as a second ordered list;

wherein the step of comparing the first representation and the second representation includes merging the first ordered list and the second ordered list.

15. A system for determining the resemblance of a plurality of documents each including a respective plurality of elements, the system comprising:

at least one memory for storing the plurality of documents; and at least one processor coupled to the at least one memory configured to:

generate a first representation of a first of the plurality of documents, the first representation including at least one proper subset of the elements of the first document;

generate a second representation of a second of the plurality of documents, the second representation including at least one proper subset of the elements of the second document; and compare the first representation and the second representation so as to determine the resemblance between the first document and the second document.

16. The system as defined in claim 15, wherein the first representation and the second representation are fixed in size.

17. The system as defined in claim 16, wherein the at least one processor is further configured to:

compute the resemblance between the first document and the second document in linear time corresponding to the fixed size of the first representation and the second representation.

18. The system as defined in claim 15, wherein the first document has a first size, and wherein the at least one processor is further configured to generate the first representation by generating the first representation in linear time corresponding to the first size of the first document.

19. The system as defined in claim 15, wherein the second document has a second size, and wherein the at least one processor is further configured to generate the second representation by generating the second representation in linear time corresponding to the second size of the second document.

20. The system as defined in claim 15, wherein the at least one subset of the elements of the first document is at least one random subset of the elements of the first document.

21. The system as defined in claim 15, wherein the at least one subset of the elements of the second document is at least one random subset of the elements of the second document.

22. The system as defined in claim 15, wherein the at least one memory is configured to:

store the first representation as a first ordered list; and store the second representation as a second ordered list;

wherein the at least one processor is configured to compare the first representation and the second representation by merging the first ordered list and the second ordered list.

23. An article of manufacture for determining the resemblance of a plurality of documents each including a respective plurality of elements, the article of manufacture comprising:

a computer readable storage medium; and computer programming stored on the storage medium; wherein the stored computer programming is configured to be readable from the computer readable storage medium by at least one computer and thereby cause the at least one computer to operate so as to:

generate a first representation of a first of the plurality of documents, the first representation including at least one proper subset of the elements of the first document;

generate a second representation of a second of the plurality of documents, the second representation including at least one proper subset of the elements of the second document; and compare the first representation and the second representation so as to determine the resemblance between the first document and the second document.

24. The article of manufacture as defined in claim 23, wherein the first representation and the second representation are fixed in size.

25. The article of manufacture as defined in claim 24, further causing the at least one computer to operate so as to:

compute the resemblance between the first document and the second document in linear time corresponding to the fixed size of the first representation and the second representation.

26. The article of manufacture as defined in claim 23, wherein the first document has a first size, and further causing the at least one computer to operate so as to:

generate the first representation in linear time corresponding to the first size of the first document.

27. The article of manufacture as defined in claim 23, wherein the second document has a second size, and further causing the at least one computer to operate so as to:

generate the second representation in linear time corresponding to the second size of the second document.

28. The article of manufacture as defined in claim 23, wherein the at least one subset of the elements of the first document is at least one random subset of the elements of the first document.

29. The article of manufacture as defined in claim 23, wherein the at least one subset of the elements of the second document is at least one random subset of the elements of the second document.

30. The article of manufacture as defined in claim 23, further causing the at least one computer to operate so as to:

store the first representation as a first ordered list;

store the second representation as a second ordered list; and comparing the first representation and the second representation by merging the first ordered list and the second ordered list.

* * * * *

UNITED STATES PATENT AND TRADEMARK OFFICE
CERTIFICATE OF CORRRECTION

PATENT NO. : 5,909,677
DATED : June 1, 1999
INVENTOR(S) : Broder et al.

It is certified that error appears in the above-identified patent and that said Letters Patent is hereby corrected as shown below:

On the title page, insert the following:

Other Documents

| |
|---|
| Brin, S., Davis, J., and Garcia-Molina, H., "Copy Detection Mechanisms for Digital Documents, "(Research) Department of Computer Science, Stanford University. |
| Broder, Andrei Z., "Some applications of Rabin's fingerprinting method" in Sequences II: Methods in Communications, Security and Computer Science, R. Capocelli. (eds), (Springer-Verlag) pp 1-10 (1993). |

Signed and Sealed this

Twenty-sixth Day of December, 2000

Attest:

Q. TODD DICKINSON

*Attesting Officer*  *Director of Patents and Trademarks*